July 19, 1949.  R. W. ALLEN  2,476,825
WHEEL RAISING AND LOWERING MECHANISM
FOR GUN CARRIAGES
Original Filed June 25, 1942  5 Sheets-Sheet 2

Inventor
Raymond W. Allen

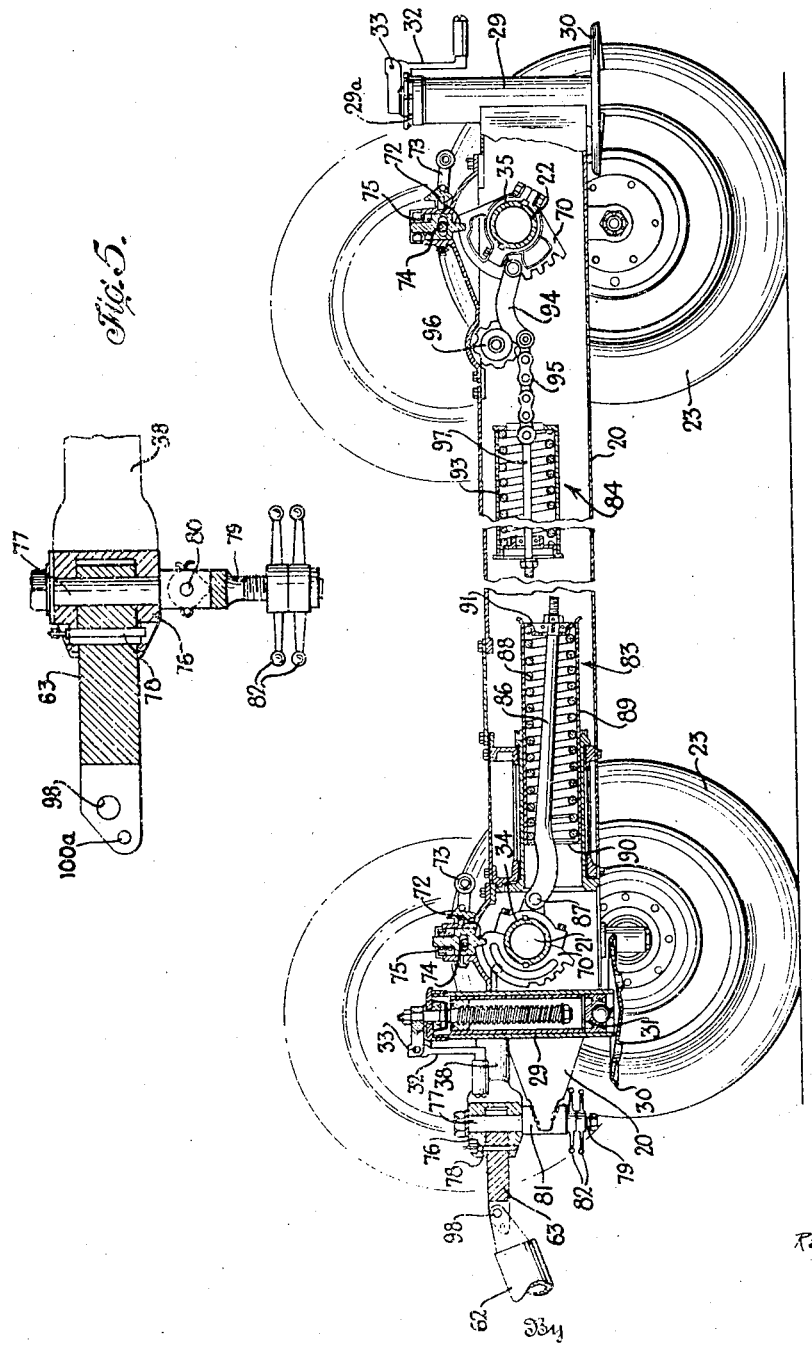

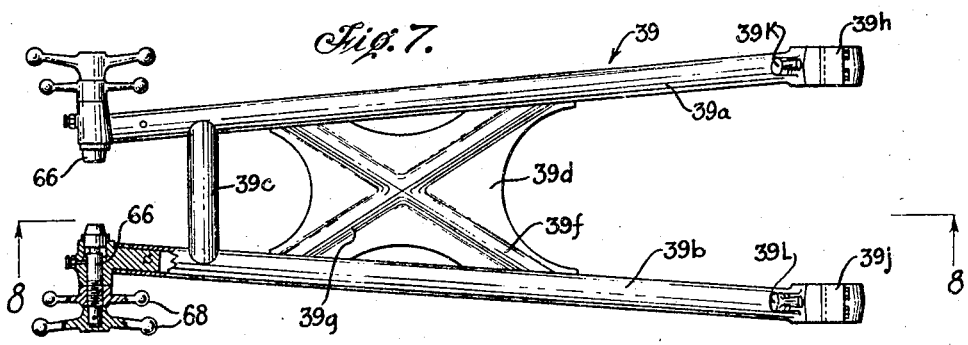
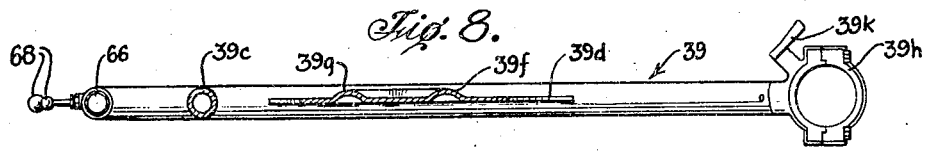
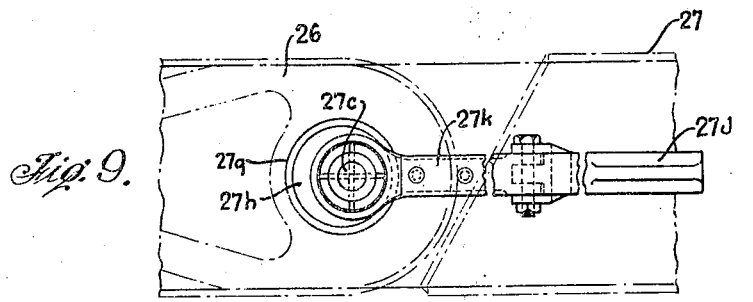
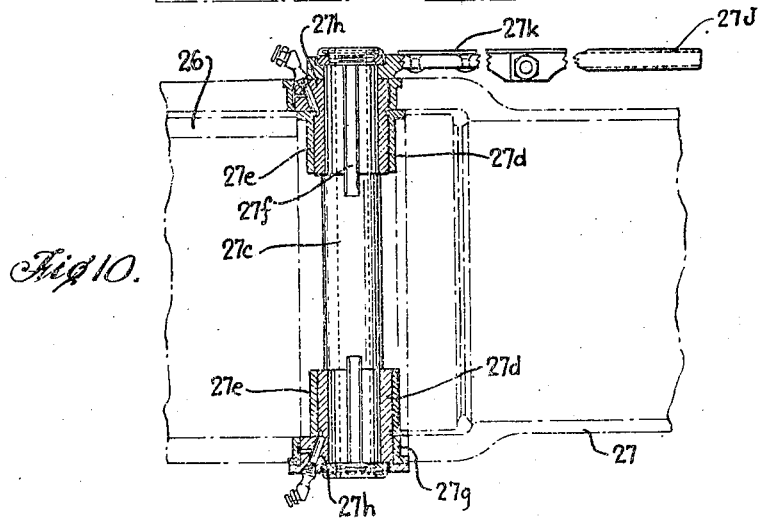

Patented July 19, 1949

2,476,825

UNITED STATES PATENT OFFICE 2,476,825

WHEEL RAISING AND LOWERING MECHANISM FOR GUN CARRIAGES

Raymond W. Allen, Akron, Ohio, assignor to The Firestone Tire & Rubber Company, Akron, Ohio, a corporation of Ohio Original application June 25, 1942, Serial No. 448,472, now Patent No. 2,415,024, dated January 28, 1947. Divided and this application June 20, 1946, Serial No. 678,106

2 Claims. (Cl. 280—44)

1

This invention relates to improvements in gun carriages. The term "gun carriage" or "gun mount" as herein employed include a wheeled frame or chassis, together with gun mounting means supported thereby and control mechanism for movement of the gun through both horizontal and vertical planes for the sighting thereof.

The present invention pertains to improvements in gun carriages of the general type disclosed in U. S. Patent No. 2,103,670 to Victor Hammer et al., and commonly termed the "Bofors" gun carriage and more particularly to the chassis of such carriage.

In the drawings:

Fig. 4 is a longitudinal section through the main carriage frame showing the wheel raising and lowering mechanism in detail.

Fig. 5 is an enlarged fragmentary section of the front yoke locking mechanism.

Fig. 7 is a plan view of the gun stay, one locking pin being shown in section.

Fig. 8 is taken along line 8—8, Fig. 7.

Fig. 9 is a plan view of an outrigger locking device and pivot pin.

Fig. 10 shows the device of Fig. 9 in longitudinal section.

Figure 1:
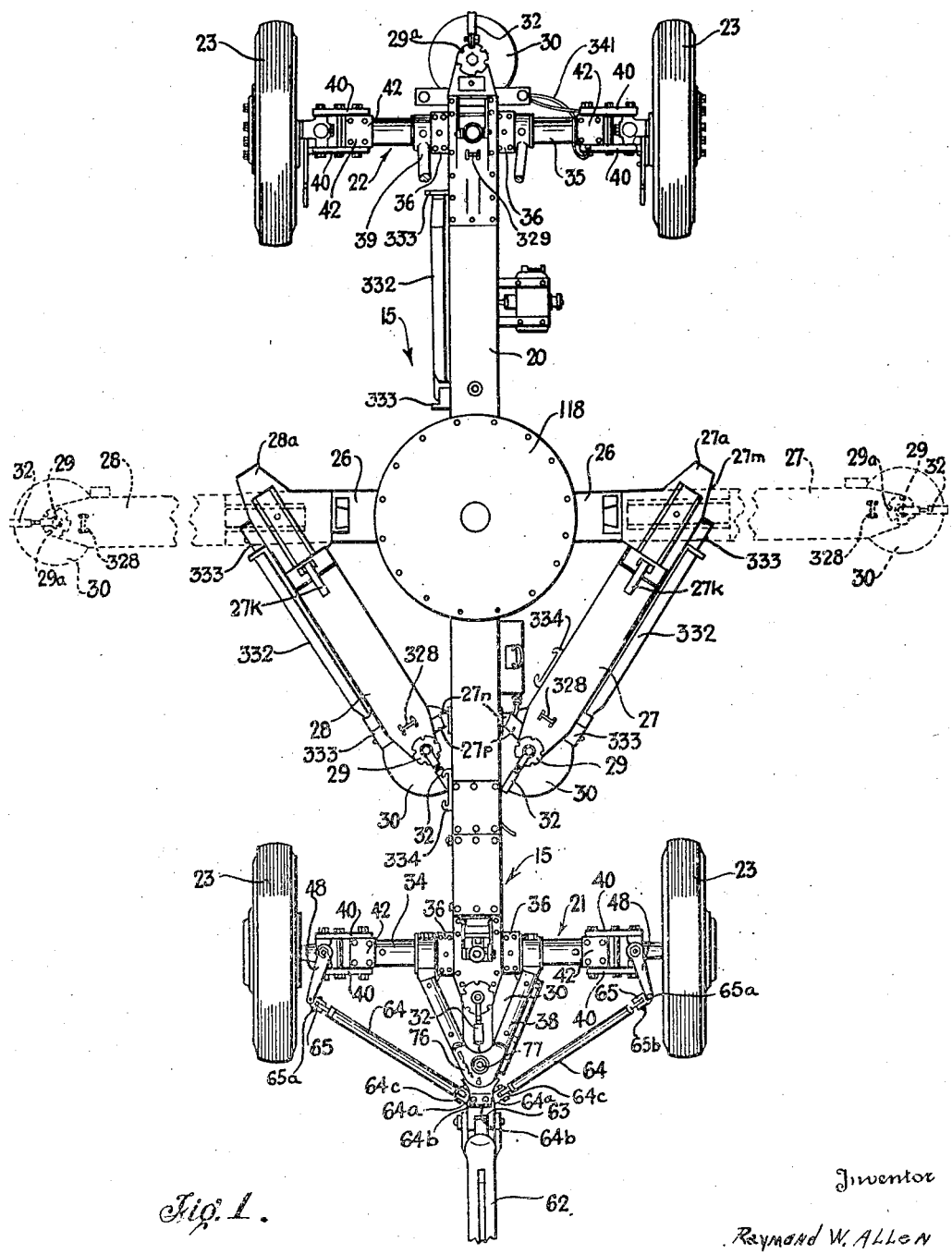
Fig. 1 is a plan view of the chassis of a gun carriage embodying the present invention the gun and its operating mechanism not shown.
Figure 2:
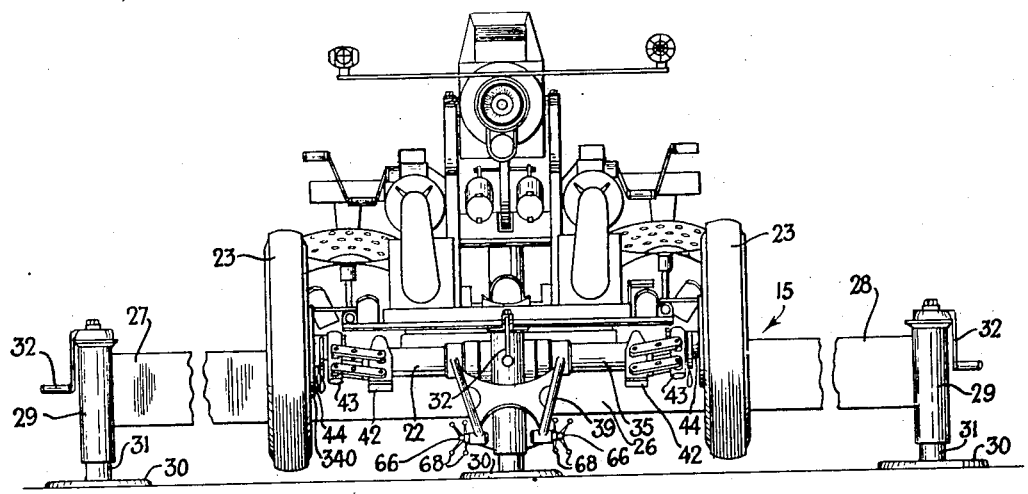
Fig. 2 is a rear elevation of the chassis shown in Fig. 1 with the carriage frame resting on the ground in gun firing or wheel retracted position and showing an anti-aircraft gun mounted thereon.
Figure 3:
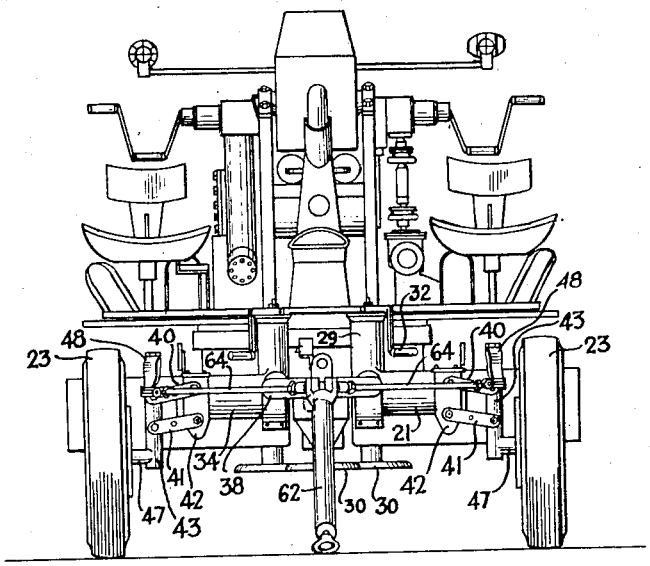
Fig. 3 shows the carriage of Fig. 2 in front elevation with the wheels in lowered or traveling position.

As shown in the drawings the chassis 15 comprises a horizontal frame member 20, substantially rectangular in cross section, and having at the ends thereof right angularly disposed axle assemblies 21 and 22 for the mounting of the carriage on wheels 23 which may be provided with conventional tire casings having bullet sealing tubes therein, or with combat type tires and rim. Member 20 is provided at a point intermediate the axle assemblies with a transverse arm 26 to which is pivoted, at the ends thereof, a pair of outriggers 27 and 28. The outriggers are adapted to be swung from a fold-back position as shown in Fig. 1 to an extended position aligned with arm 26 as shown in Fig. 2. Each outrigger is provided

2 at the outer end thereof with a screw jack 29 having a ground engaging foot plate 30 swivel-connected to the lower end of a post 31, the post being manually adjustable by cranks 32, pivoted at 33, to allow folding into the position shown during non-use. The upper end of jack 29 is provided with six circumferential slots 29a equally spaced to permit locking of the jack screw at intervals of 60°. Suitable means, later described, are provided for locking the outriggers in either a foldback position for travel or in a laterally extended position for ground engagement of foot plates 30 during operation of a gun mounted on the carriage.

As shown in Fig. 1, outriggers 27, 28 have their pivoted ends protected by covers 27a, 28a during travel, the covers being removably attached to permit removal prior to positioning of the outriggers in firing position. Each outrigger, 27 for example, is pivoted to transverse arm 26 as shown in Figs. 9 and 10. A pintle 27c, carrying sleeve 27d is journaled in arm 26 by bushings 27e. Sleeves 27d are adapted to rotate with pintle 27c by reason of their engagement with splines 27f of pintle 27c. The outer ends of sleeves 27d have integral radial flanges 27h, eccentric in respect to pintle 27c to provide cam means, rotatable with the pintle, for the shifting of outrigger 27 in respect to member 26, the outrigger carrying bushings 27g engaging the cam flanges 27h. The upper end of pintle 27c carries a lever arm 27k, having a pivoted handle extension 27j for manipulation of the pintle and its associated cam mechanism.

Outrigger arm 27 is provided at its pivoted end with a tapered arm engaging portion 27m, arm 26 being adapted to receive said portion in locked engagement therewith when in the dotted line position shown in Fig. 1, lever 27k being rotated to longitudinally move the arm and outrigger into engagement by means of the above described cam action. Upon release of the lock mechanism and return of the outrigger to the traveling position, lever 27k is again rotated to longitudinally move outrigger 27 to effect locking engagement between bracket 27p, carried at the outer end of the outrigger, and hook 27n, mounted on chassis member 20 to extend laterally therefrom.

Figure 6:
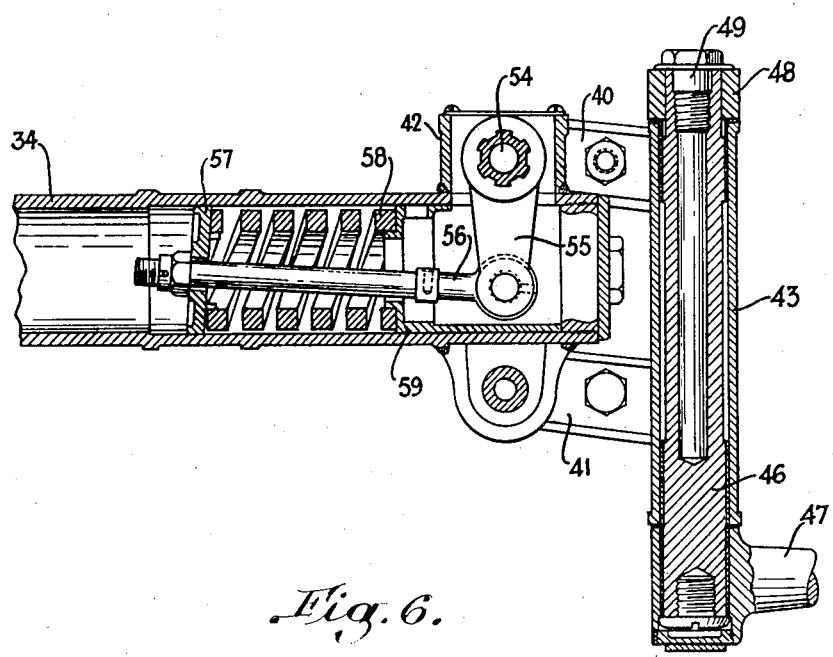
Fig. 6 is a longitudinal fragmentary section through the front axle and wheel suspension mechanism.

Axle assemblies 21 and 22 are substantially identical, each comprising a rigid shaft, 34 and 35, respectively, Figs. 1, 4 and 6, said shafts extending through the main frame member 20 and suitably journaled thereto at 36 to permit rotation about the shaft axes. Assemblies 21 and 22 respectively are provided with yokes 38 and 39, later described, to permit rotation of the assemblies from a lowered to a raised wheel position as shown in heavy and dotted line positions, Fig. 4, the yokes being lockable in the positions shown with yoke 38 providing connecting means for a draught bar while yoke 39 provides a gun stay during travel. Wheel mounting spindle assemblies are linked to the axle ends in offset outwardly extending relation thereto by means of paired shackles or link connectors 40 and 41, the shackle ends being suitably pivoted to crossheads 42 at the axle termini and to housings 43 carrying wheel spindles 44 respectively. To permit steering of the front wheels the spindle assembly of the front axle assembly 21 comprises the link-engaged housing 43 in which is journaled a shaft 46 normally carrying a wheel mounting spindle 47 at the lower end thereof.

Shaft 46 has a splined upper end portion to which a steering lever 48 is secured by clamping bolt 49. The upper axle bracket pivot pin 54 has splined thereto a lever 55 extending into tubular axle 34 to operate as a bell crank pivotable with shackle 40. A spring compression rod 56 has one end pivotally engaged with lever 55, the opposite end loosely carrying a washer 57 against which a helical spring 58 abuts, opposite end of the spring abutting an annular shoulder 59. The spring is normally maintained under compression and is responsive to wheel movement through a vertical plane whereby to provide shock absorption means between the wheel and the frame to which axle 34 attaches.

Yoke 38 engaging front axle shaft 34, is adapted to be clamped in the position shown in Figs. 1 and 4 to secure the wheels in a lowered position for travel, the yoke being swung inwardly to raise the wheels and allow base plates 30 to contact the ground for the rigid positioning of the base frame for gun firing. The yoke also serves, as above stated, as connecting means for a draught bar 62 which is connected thereto through an intervening double clevis link 63. The latter provides a connection for a pair of tie rods 64 having the adjacent ends pivoted thereto by means of universal joints 64a, and having their remote ends pivotally connected to steering levers 48 by universal joints 65. The joints 64a have vertical pivots 64b engaging the link 63 and horizontal pivots 64c engaging the tie rods 64. Joints 65 pivot about vertical lever pins 65a and horizontal tie rod pins 65b. The arrangement enables steering of the front wheels in response to movement of the draught bar 62.

The rear axle yoke 39, best shown in Figs. 7 and 8, comprises paired rods 39a, 39b, converging from the axle to provide a lever swingable outwardly to the position shown in Fig. 1 to raise the rear wheels when the carriage is lowered to operative position, the outer end of the yoke being provided with set screws 66 for engagement with bores, not shown, provided in the gun breech, whereby the yoke provides a gun stay to position the gun when the gun carriage is in a traveling or wheel lowered position. Double wing nuts 68 are provided to prevent loosening of screws 66. Rods 39a, 39b have welded therebetween a connector rod 39c and a sheet metal web 39d. Web 39d is generally X-shape in plan, and is reinforced by interconnected ribs 39f, 39g formed by stamping. Provision of web 39d in effect provides diagonal bracing of the web side members 39a, 39b at a substantially reduced manufacturing cost. The yoke members are joined in unitary assembly by arc welding the joined portions. Axle engaging ends 39h, 39j, are provided with locking screws 39k, 39L to prevent relative movement between the axle and stay.

Axles 34 and 35, each carry a centrally positioned toothed quadrant 70, the teeth thereof being spaced through an arc of more than 90°. The quadrants are positioned within the main frame member 20 in a position for engagement with pawls 72, whereby to provide means for locking each axle in a desired wheel position. Pawls 72 may be actuated in and out of locking engagement with the quadrant through pivot lever 73 carrying an eccentric pin 74, to move the pawl against the urge of a spring 75 to release it from the segment. During travel, the stresses tending to rotate the front axle assembly 21 are not ordinarily transmitted to the pawl and quadrant 70 by reason of yoke 38 being securely clamped directly to the front end of member 20 to prevent axle rotation respecting the frame when the device is set up for traveling, as best shown in Fig. 4. When the wheels are in raised position, the pawl and quadrant provide locking means to maintain the wheels above the ground.

Yoke 38, generally V-shaped, is provided at its outer end with a bifurcated portion 76 through which a link-connecting pivot pin 77 extends, Figs. 4 and 5, said pin engaging one end of the double clevis link 63 to permit pivoting of the link through a horizontal plane when the yoke is clamped to the main frame as shown in Fig. 4. The link 63 may be secured in fixed position with relation to yoke-end 76 by means of a locking pin 78 insertable through aligned apertures in the link and yoke-end. Pin 77 has an extension rod 79 pivoted to its lower end at 80 to permit rod 79 to be swung into and out of engagement with a vertically slotted member 81 welded to the front end of frame member 20. A pair of wing nuts 82 threadedly engage rod 79 to provide clamp means for locking the front end of yoke 38 to the frame as shown in Fig. 4.

To counter-balance the weight of the carriage and its gun during the raising and lowering operations, suitable energy storing units 83 and 84 are provided. These units are disposed within the main frame member 20 for association with the wheels through the axles 34 and 35 in a manner to offset the effect of gravity during pivotal movement of the wheels from a lowered to a raised position or vice versa. The front wheel energy storing unit 83 comprises a spring compression rod 86 pivotally connected to axle mounted segment 70 at 87, rod 86 extending through a helical spring 88 maintained within housing 89 between a cylinder 90 within the housing and a spring engaging cap 91 carried by the compression rod 86 at the outer end thereof. Rotation of axle 34 and segment 70 causes rod 86 to be drawn toward the axle assembly with resultant compression of spring 88. The weight of the carriage and the gun aids in the compression of the spring until the front end of the carriage rests upon the ground engaging feet 30. Conversely, when the axle assembly is rotated in the opposite direction to lower the wheels, the stored energy of spring 88 operates counter to the weight of the carriage and gun to aid in swinging the carriage into a traveling position.

Energy storing unit 84 associated with the rear axle, works on the same principle, spring 93 working counter to gravity. The spring is suitably housed and is connected to the rear axle segment 70 through pivoted lever 94 and chain 95, a sprocket 96 being provided to insure straight line pull on the spring compression rod 97.

Operation of the device is as follows: The carriage is made ready for conversion from a raised or traveling position to a lowered or firing position by first swinging outrigger arms 27 and 28 from the folded position shown in heavy lines, Fig. 1, to the outwardly extending dotted line position shown therein in heavy lines, Fig. 2, the outriggers being locked in that position. The yokes 38 and 39 are then unlocked from the chassis and gun breech respectively in the manner above taught and individually or simultaneously swung in the direction to lower the carriage frame onto the ground, each axle assembly 21 and 22 being then locked by its associated quadrant and pawl device.

Ground stakes or pickets 332 are removed from their carrying brackets 333, Fig. 1, and lowered through guide brackets 334, on the main frame and outriggers, to be driven into the ground. The chassis is then levelled by manipulation of jacks 29, spirit levels 328 being provided near the outrigger ends for this purpose, as shown in Fig. 2. Level 329 is provided at the rear end of the carriage chassis, the chassis being levelled from the front end.

The carriage is preferably provided with four wheel electrically operable brakes 340.

This application is a division of application No. 448,472, filed June 25, 1942, now Patent No. 2,415,024, dated January 28, 1947.

What is claimed is:

1. In a gun carriage, the combination with a frame member, an axle in journaled right angular relation to said member and extending therethrough, shackles pivoted to the ends of said axle, wheels carried by said shackles in eccentric relation to the axle, a toothed quadrant carried by the axle, a manually operable quadrant engaging pawl mounted on the frame member for locking the axle against rotation in respect to the frame, a yoke having arms engaging said axle at each side of the frame member, said arms diverging axially of the frame member in general V-shape, and releasable clamp means between the yoke and frame member to provide auxiliary means for constraining the axle against rotation in respect to the frame member.

2. In a gun carriage, the combination with a frame, an axle journaled therein, a pair of wheels connected to the axle in offset relation thereto, a yoke extending from the axle to provide means for the manual rotation of the axle to raise and lower the wheels in respect to the frame, a bolt extending through said yoke at a point spaced from the axle, an extension rod pivoted to said bolt, said frame being provided with a slot into which said extension rod pivots when the yoke is swung into a wheel lowered position, and clamp means carried by said rod for engagement of said frame adjacent said slot whereby to lock said yoke in a wheel lowered position.

RAYMOND W. ALLEN.

REFERENCES CITED

The following references are of record in the file of this patent:

UNITED STATES PATENTS

| Number | Name | Date |
| --- | --- | --- |
| 1,731,149 | Raffenbeul | Oct. 8, 1929 |
| 1,743,119 | Cowell | Jan. 14, 1930 |
| 1,830,048 | Barnard | Nov. 3, 1931 |
| 1,884,323 | Snow | Oct. 25, 1932 |
| 1,930,619 | Jonkhoff | Oct. 17, 1933 |
| 1,995,375 | Carter | Mar. 26, 1935 |
| 2,415,024 | Allen | Jan. 28, 1947 |